(12) United States Patent
Attimont et al.

(10) Patent No.: US 6,389,297 B1
(45) Date of Patent: May 14, 2002

(54) RADIOCOMMUNICATIONS TERMINAL

(75) Inventors: Luc Attimont, Le Port Marly; Jannick Bodin, Garches, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/282,443

(22) Filed: Mar. 31, 1999

(30) Foreign Application Priority Data

Apr. 20, 1998 (FR) .............................. 98 04929

(51) Int. Cl.[7] .............................. H04B 1/38; H04M 1/00
(52) U.S. Cl. .................... 455/550; 455/90; 455/569; 379/433.02; 379/433.03; 379/434
(58) Field of Search .................... 455/90, 575, 569, 455/570, 345, 550; 379/433, 434, 444, 420, 433.01, 433.02, 433.03

(56) References Cited

U.S. PATENT DOCUMENTS 4,845,738 A * 7/1989 Takano ...................... 379/443
5,751,804 A * 5/1998 Mendolia ................... 379/433

FOREIGN PATENT DOCUMENTS

| DE | 38 36 406 A1 | | 5/1990 |
|---|---|---|---|
| EP | 0283853 A2 | * | 9/1988 |
| EP | 0 651 546 A1 | | 5/1995 |
| JP | 03201753 A | * | 9/1991 |
| JP | 04311135 A | * | 11/1992 |
| JP | 410023121 A | * | 1/1998 |
| JP | 11284706 A | * | 10/1999 |

* cited by examiner

Primary Examiner—Nguyen T. Vo
(74) Attorney, Agent, or Firm—Sughrue Mion, PLLC

(57) ABSTRACT

The invention relates to a radiocommunications terminal comprising a housing having a front face, a back face, and a base, the terminal further comprising a microphone and an earpiece mounted inside the housing, and being provided with at least one input opening constituting an input interface with the microphone, and at least one output opening constituting an output interface with the earpiece, the input opening being on said back face.

21 Claims, 4 Drawing Sheets

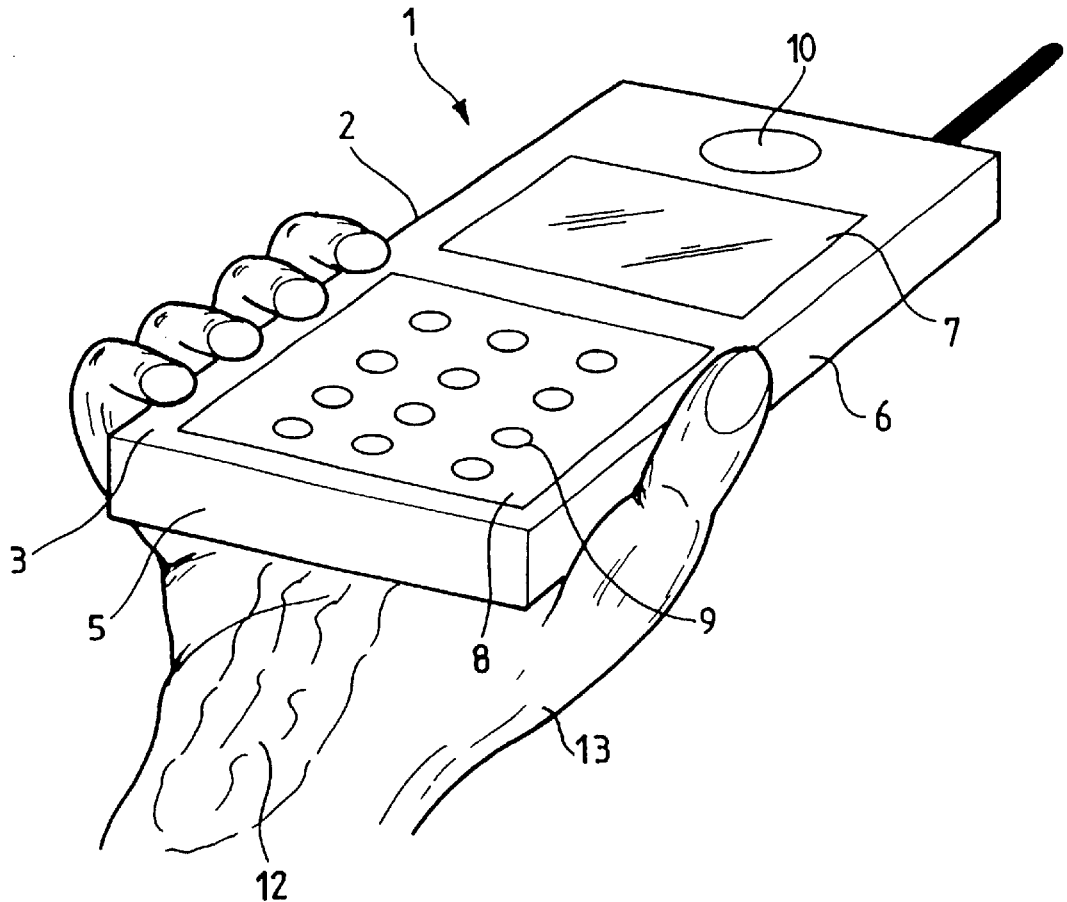
FIG_1
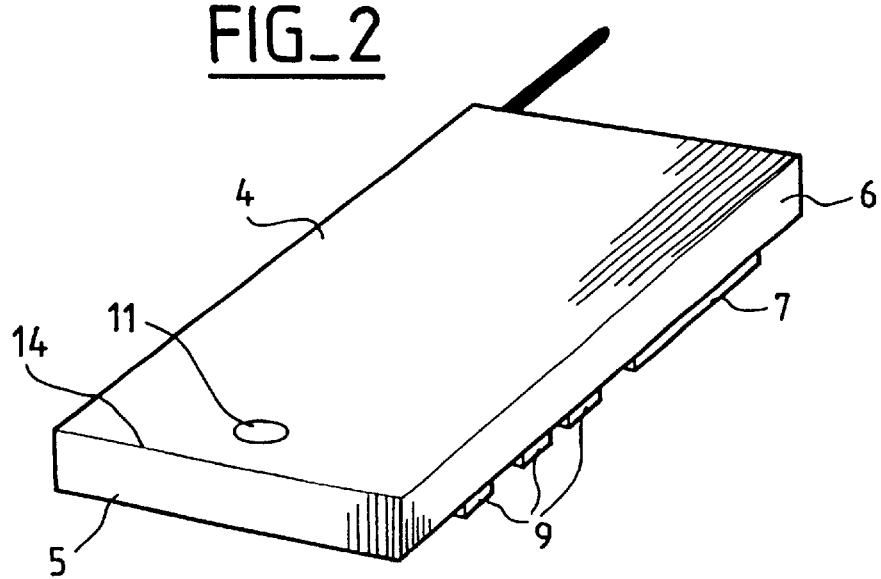
FIG_2

FIG_3
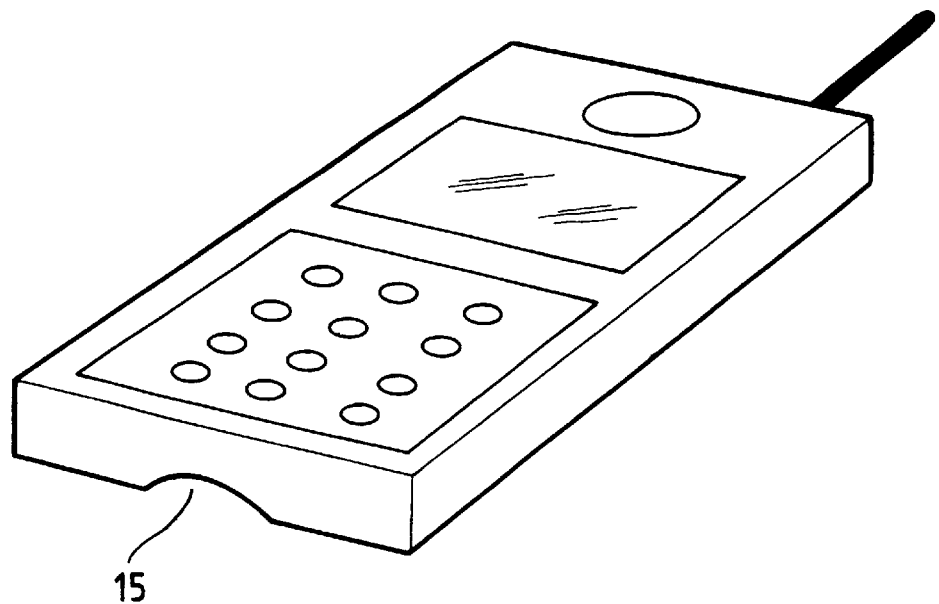
FIG_4
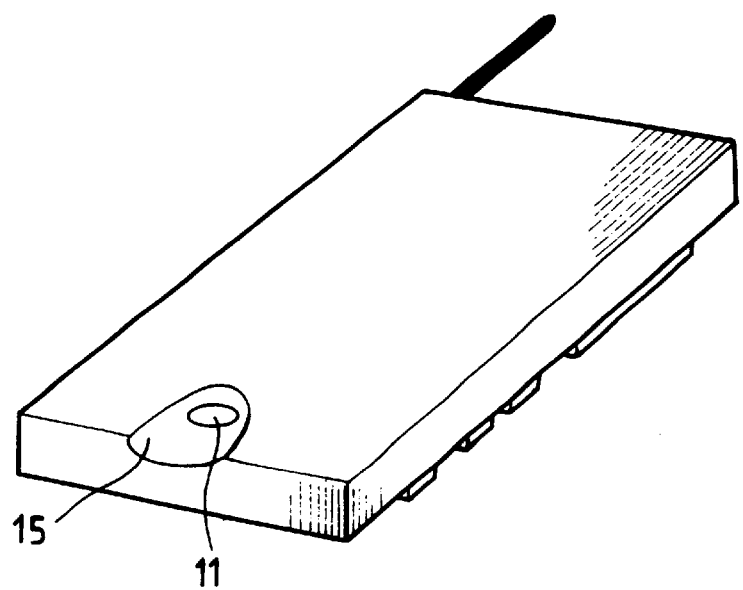

FIG_5
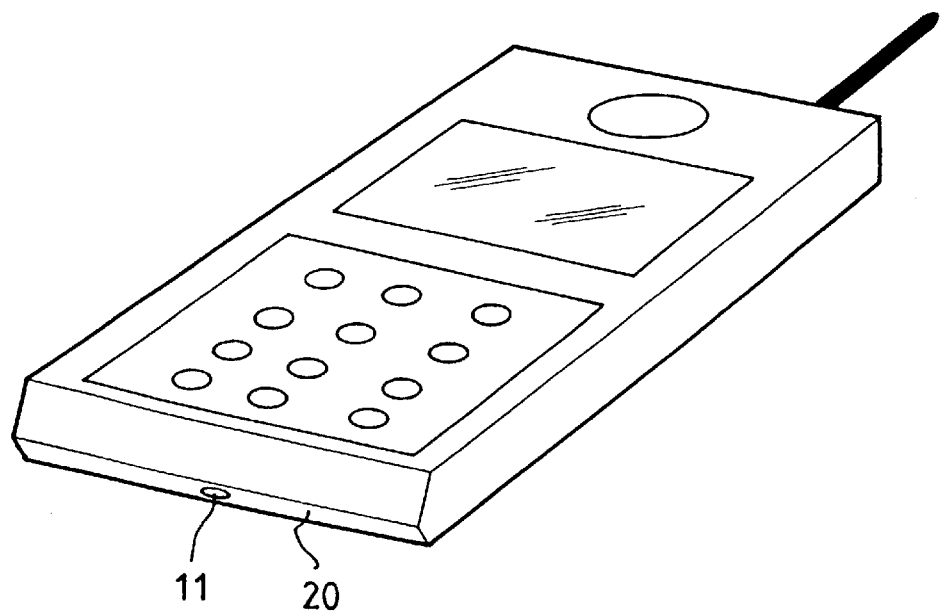
FIG_6
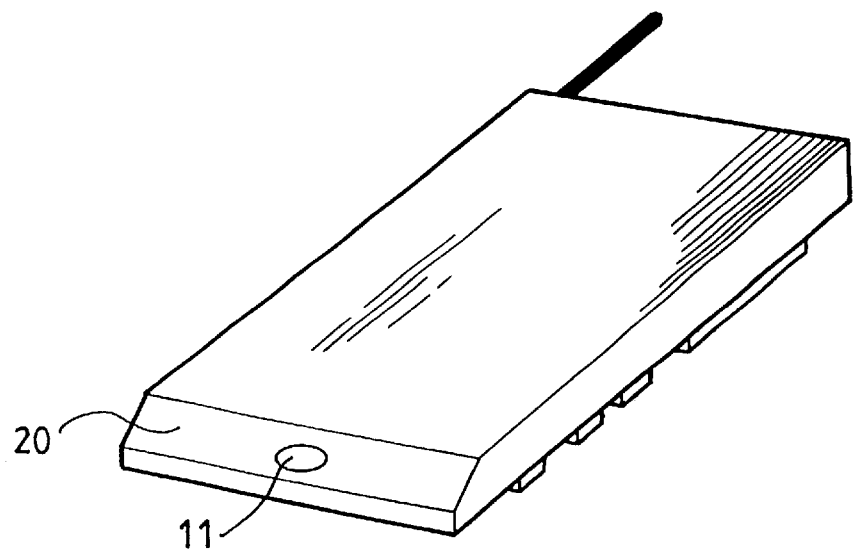

FIG_7
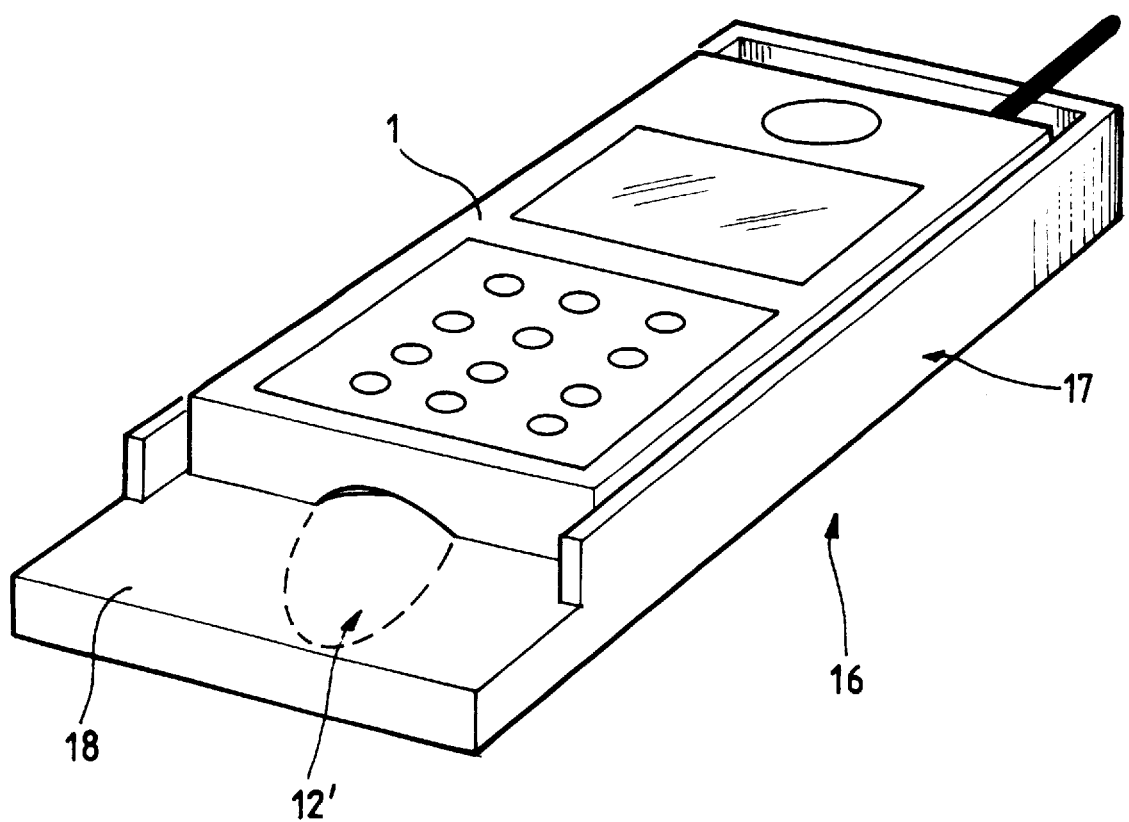

RADIOCOMMUNICATIONS TERMINAL

FIELD OF THE INVENTION

The invention relates to a radiocommunications terminal.

More precisely, the term "radio(tele)communications terminal" is used in non-limiting manner to cover both cordless telephone terminals and GSM-type mobile telephone terminals.

The invention is more particularly applicable to radiotelecommunications terminals which are of small size and for which it is difficult to reproduce the distance between the mouth and the ear of the user, which distance needs to be reproduced in order to enable the audio portion of the terminal to operate properly.

BACKGROUND OF THE INVENTION

Usually, a radiocommunications terminal comprises a housing having a front face, a back face, and a base. The front face is generally provided with a keypad, a screen, an input opening constituting an input interface with a microphone, and an output opening constituting an output interface with an earpiece. The microphone and the earpiece are mounted inside the housing, the inlet of the microphone and the outlet of the earpiece facing respectively the input opening and the output opening.

One solution to the above-mentioned problem consists in adding a piece to the terminal so as to enable the microphone to be deployed so that the distance between the microphone and the earpiece of the terminal substantially corresponds to the distance between the mouth and the ear of the user.

In Document EP 0 651 546, that piece is in the form of a flap hinged to the base of the housing, and which, in the in-use position, serves to extend the terminal. The flap contains the microphone, and is provided with an input opening on its face that corresponds to the front face of the housing.

That document also describes another solution in which the flap is replaced with a shorter, angularly-positionable piece.

Unfortunately, those solutions require an additional mechanical piece to be added to the terminal together with mechanical link means, thereby increasing the volume and the cost of the terminal.

Furthermore, the mechanical link means are of limited life span, and, like all mechanical equipment, they are not very reliable.

OBJECTS AND SUMMARY OF THE INVENTION

The invention aims to mitigate those drawbacks.

An object of the invention is to provide a telephone terminal whose structure makes it possible to satisfy the required distance between the mouth and the ear of the user, in a manner such that the audio portion of the terminal operates properly, and without adding any additional mechanical elements to the terminal.

Another object of the invention is to provide a radiocommunications terminal whose cost and volume are low.

To this end, in a first aspect, the invention provides a radiocommunications terminal comprising a housing having a front face, a back face, and a base, the terminal further comprising a microphone and an earpiece mounted inside the housing, and being provided with at least one input opening constituting an input interface with the microphone, and at least one output opening constituting an output interface with the earpiece, wherein the input opening is on said back face.

Thus, in the normal-use position, i.e. when the user is engaged on a call and is holding the terminal in the hand, the input opening constituting the input interface with the microphone is in the vicinity of the palm of the hand, so that an acoustic waveguide is formed by the back face of the housing and by the cavity formed between the terminal and the palm of the hand.

As a result, the distance between the mouth and the ear of the user is reproduced, so that the audio portion operates properly without increasing the volume or the cost of the terminal, or reducing its reliability.

In addition, in the hands-free position, i.e. when the terminal is put down on a table, for example, the table also makes it possible to form an acoustic waveguide, so that sound is transmitted properly in this position also.

In an embodiment making it possible to place the microphone as far as possible from the earpiece, the microphone is mounted in the vicinity of a border zone between the base and the back face of the housing.

In addition, in order to obtain a further improvement in guiding the speech of the user, a recess is provided in the border zone.

This recess may have a rounded shape provided in a portion of said border zone, and extending substantially to the center of the border zone.

In another embodiment, the recess has a bevel shape.

So that it is not necessary to modify the position of the microphone in already-existing terminals, in which the microphone usually faces towards the front face of the housing, the terminal further comprises an acoustic waveguide lead-in that is provided in the housing, in the vicinity of the microphone, and that has its inlet facing the microphone and its outlet facing the input opening constituting the input interface with the microphone.

In a second aspect, the invention provides a hands-free set comprising a terminal of the invention, said set further comprising surface-forming means distinct from the terminal, and co-operating with the back face of the housing of the terminal to create an acoustic waveguide that serves to guide speech uttered by a user towards the input opening constituting the input interface with the microphone.

In an embodiment, the surface-forming means are constituted by the element against which the back face of the housing is applied.

In a third aspect, the invention provides acoustic waveguide forming means designed to be used with a terminal of the invention, and having a shape such that they co-operate with the back face of the housing of the terminal to create an acoustic waveguide making it possible to guide speech uttered by a user towards the input opening constituting the input interface with the microphone.

BRIEF DESCRIPTION OF THE DRAWINGS

The invention will be better understood on reading the following description of embodiments given merely by way of example and with reference to the accompanying figures, in which:

FIG. 1 is a diagrammatic perspective view, front face up, of a first embodiment of a terminal of the invention in the in-use position;

FIG. 2 is a diagrammatic perspective view, back face up, of the terminal shown in FIG. 1;

FIG. 3 is a diagrammatic perspective view, front face up, of a second embodiment of a terminal in the in-use position;

FIG. 4 is a diagrammatic perspective view, back face up, of the terminal shown in FIG. 3;

FIG. 5 is a diagrammatic perspective view, front face up, of a third embodiment of a terminal in the in-use position;

FIG. 6 is a diagrammatic perspective view, back face up, of the terminal shown in FIG. 5; and FIG. 7 is a diagrammatic perspective view, front face up, of an embodiment of a hands-free set of the invention.

MORE DETAILED DESCRIPTION

The terminal 1 is designed to be used either in a "normal" position, in which it is held in the hand of the user, or else in a "hands-free" position.

It includes a housing 2 having a front face 3, a back face 4, a base 5, and side edges 6.

In particular, a screen 7 and a keypad 8 having keys 9 are mounted on the front face 3. In addition, the front face 3 is provided with an output opening 10 which constitutes an interface with an earpiece (not shown) mounted inside the housing 2. As is known to the person skilled in the art, the interface with the earpiece may be made up of a plurality of output openings 10.

In addition, the terminal 1 is provided with an input opening 11 constituting an input interface with a microphone (not shown) also mounted inside the housing 2. The input interface may also be made up of a plurality of input openings 11.

In the invention, the input opening 11 is provided in the back face 4 of the housing 2 of the terminal 1.

Thus, in the normal-use position, the speech uttered by the user is guided towards the input opening 11 by means of an acoustic waveguide 12 which is shown in dashed lines in FIG. 1, and which is formed by the back face 4 of the housing 2, and by the cavity created between the terminal and the palm of the hand 13 of the user. The waveguide 12 makes it possible to reproduce the distance between the mouth and the ear of the user, which distance needs to be reproduced in order for the audio portion of the terminal 1 to operate properly, in particular with terminals that small in size.

However, this structure may also be applied to terminals of larger size and for which the distance between the input opening and the output opening already substantially corresponds to the distance between the mouth and the ear of the user. This structure then offers the advantage of making more space available on the front face, compared with prior art terminals, because it is no longer necessary to provide specific space on the front face for the input opening.

The waveguide 12 is also present when the terminal 1 is in the hands-free position. In which case, it is formed by the back face 4 of the housing 2 and by the cavity created between the terminal and the surface against which the back face 4 is applied. This surface may be constituted by a table top, by the face of a wall if the terminal is in the vertical position, or by some analogous means.

Preferably, the input opening 11 is situated in the vicinity of a border zone 14 between the back face 4 and the base 5 of the housing 2, so that the distance between it and the earpiece is as large as possible. In addition, in view of the shape of a user's hand, the input opening 11 is preferably centered relative to the side edges 6 of the housing 2.

In order to improve guidance of speech from the user, a recess is provided in the border zone 14.

In a first embodiment, as shown in FIGS. 3 and 4, the recess is a hollow 15 having a rounded shape and provided in a portion of said border zone 14. Preferably, the hollow 15 extends substantially to the center of the border zone 14.

In a second embodiment, as shown in FIGS. 5 and 6, the recess is in the form of a bevel 20.

Naturally, the scope of the present invention is not limited to the details of the embodiments considered above by way of example, but rather it extends to modifications accessible to the person skilled in the art.

In addition, in order to avoid modifying microphone location in current terminals, the terminal 1 may be provided with an acoustic waveguide lead-in that is provided inside the housing 2, in the vicinity of the microphone, and that has its inlet facing the microphone and its outlet facing the input opening 11.

The invention also relates to a hands-free set 16 as shown in FIG. 7.

This set 16 comprises a terminal 1 as described above and a stand 17 for receiving the terminal 1. One of the faces of the stand 17 (its top face 18 in the figure) constitutes surface-forming means distinct from the terminal 1, and co-operating with the back face 4 of the housing 2 of the terminal 1 to create an acoustic waveguide 12' that is similar to the waveguide 12, and that serves to guide speech uttered by a user towards the input opening 11 constituting the input interface with the microphone.

More generally, the surface-forming means are constituted by the element against which the back face 4 of the housing 2 is applied.

Finally, the invention relates to acoustic waveguide forming means designed to be used with the above described terminal 1 and having a shape such that they co-operate with the back face 4 of the housing 2 of the terminal to create an acoustic waveguide making it possible to guide speech uttered by a user towards the input opening 11 constituting the input interface with the microphone.

What is claimed is:

1. A radiocommunications terminal comprising a housing having a front face, a back face, and a base, the terminal further comprising a microphone and an earpiece mounted inside the housing, and being provided with at least one input opening constituting an input interface with the microphone, and at least one output opening constituting an output interface with the earpiece and positioned on the front face, wherein the input opening is only on said back face, wherein a recess is provided in a border zone between the base and the back face.

2. A terminal according to claim 1, wherein the microphone is mounted at said border zone between the base and the back face of the housing.

3. A terminal according to claim 1, wherein the recess has a rounded shape provided in a portion of said border zone.

4. A terminal according to claim 3, wherein the rounded shape extends substantially to a center portion of the border zone.

5. A terminal according to claim 1, wherein the recess has a bevel shape.

6. A terminal according to claim 1, further comprising an acoustic waveguide lead-in positioned proximal to the microphone, and having an inlet facing the microphone and an outlet facing the input opening constituting the input interface with the microphone.

7. The terminal according to claim 1, further comprising a hands-free set having a surface-forming means distinct from the terminal, and co-operating with the back face to create an acoustic waveguide that guides prescribed sound waves towards the input opening.

8. The terminal according to claim 7, wherein the surface-forming means comprise an element against which the back face of the housing is applied.

9. The terminal according to claim 1, further comprising an acoustic waveguide forming means configured to co-operate with the back face to create an acoustic waveguide that guides sound waves from a predetermined source towards the input opening.

10. A radiocommunications terminal comprising:

a housing having a front face, a back face, and a base, the terminal further comprising a microphone and an earpiece mounted inside the housing, and being provided with an input opening constituting an input interface with the microphone, and an output opening constituting an output interface with the earpiece, wherein the input opening is on said back face; and a hands-free set comprising a surface-forming means distinct from the terminal, and cooperating with said back face to create an acoustic waveguide that guides prescribed sound waves generated by a user towards said input opening.

11. The radiocommunications terminal of claim 10, wherein the surface-forming means comprises an element against which the back face of the housing is applied.

12. A radiocommunications terminal comprising:

a housing having a front face, a back face, and a base, the terminal further comprising a microphone and an earpiece mounted inside the housing, and being provided with an input opening constituting an input interface with the microphone, and an output opening constituting an output interface with the earpiece, wherein the input opening is on said back face; and an acoustic waveguide forming means configured to co-operate with said back face to create an acoustic waveguide that guides prescribed sound waves generated by a user towards said input opening.

13. A communication device, comprising:

a housing having a first side and a second side opposite to each other;

a receiver positioned only at an opening on the first side to receive sound waves;

a transmitter positioned at an opening on the second side to transmit a user-recognizable signal; and a hands-free device that is detachable from the device and operates in accordance with a location of the first side to create an acoustic waveguide that guides prescribed sound waves to said receiver.

14. The communication device of claim 13, wherein said transmitter is positioned only at said opening on said second side.

15. The communication device of claim 13, further comprising a device that operates in accordance with a location of the first side to generate an acoustic waveguide that guides sound waves from a predetermined source to said receiver.

16. A communication device, comprising:

a housing having a first side and a second side opposite to each other;

a receiver positioned at an opening on the first side to receive sound waves;

a transmitter positioned only at an opening on the second side to transmit a user-recognizable signal and;

a hands-free device that is detachable from the device and operates in accordance with a location of the first side to create an acoustic waveguide that guides prescribed sound waves to said receiver.

17. The communication device of claim 16, wherein said receiver is positioned only at said opening on said first side.

18. The communication device of claim 16, further comprising a device that operates in accordance with a location of the first side to generate an acoustic waveguide that guides sounds waves from a predetermined source to said receiver.

19. A radiocommunications terminal comprising a housing having a front face, a back face, and a base, the terminal further comprising:

a microphone and an earpiece mounted inside the housing, and being provided with at least one input opening constituting an input interface with the microphone, and at least one output opening constituting an output interface with the earpiece and positioned on the front face, wherein the input opening is only on said back face; and a hands-free set having a surface-forming means distinct from the terminal, and cooperating with the back face to create an acoustic waveguide that guides prescribed sound waves towards the input opening.

20. The terminal according to claim 19, wherein the surface-forming means comprise an element against which the back face of the housing is applied.

21. A radiocommunications terminal comprising a housing having a front face, a back face, and a base, the terminal further comprising:

a microphone and an earpiece mounted inside the housing, and being provided with at least one input opening constituting an input interface with the microphone, and at least one output opening constituting an output interface with the earpiece and positioned on the front face, wherein the input opening is only on said back face; and an acoustic waveguide forming means configured to co-operate with the back face to create an acoustic waveguide that guides sound waves from a predetermined source towards the input opening.

* * * * *